United States Patent [19]

Sato et al.

[11] 3,960,458

[45] June 1, 1976

[54] FITTINGS FOR CONNECTING COLUMNS AND BEAMS OF STEEL FRAME CONSTRUCTION

[75] Inventors: Kuniaki Sato, Hiratsuka; Kozo Toyama, Tokyo; Toshio Saheki, Kodaira; Kaoru Mizukoshi, Hino; Shuei Suzuki, Machida, all of Japan

[73] Assignees: Kajima Corporation; Hitachi Metals Ltd., both of Tokyo, Japan

[22] Filed: Feb. 26, 1975

[21] Appl. No.: 552,969

[30] Foreign Application Priority Data

Mar. 1, 1974   Japan.............................. 49-23975

[52] U.S. Cl................................ 403/189; 403/406; 52/758 F
[51] Int. Cl.² .......................................... F16B 7/08
[58] Field of Search .......... 403/189, 187, 406, 407, 403/388, 231, 232; 52/758 R, 758 B, 758 F, 760

[56] References Cited

UNITED STATES PATENTS

| 1,252,336 | 1/1918 | Frederickson ................ 52/758 R X |
| 2,163,209 | 7/1939 | Pungel.......................... 52/758 B X |
| 2,201,826 | 5/1940 | Ditchfield .................... 52/758 R X |

FOREIGN PATENTS OR APPLICATIONS 716,659   10/1954   United Kingdom .............. 52/758 B

*Primary Examiner*—Werner H. Schroeder
*Assistant Examiner*—Wayne L. Shedd

[57] ABSTRACT

Fittings for connecting columns and beams of a steel frame construction, each comprising a base plate to be connected to the column by means of high strength bolts and formed centrally with a horizontal protrusion on the side of the beam and a horizontal plate extending from the horizontal protrusion adapted to be connected to the flange of the beam in overlapping relation by welding or bolting, a thickness of which horizontal protrusion at its bottom is more than that of the flange of the beam.

6 Claims, 13 Drawing Figures

FIG_1a
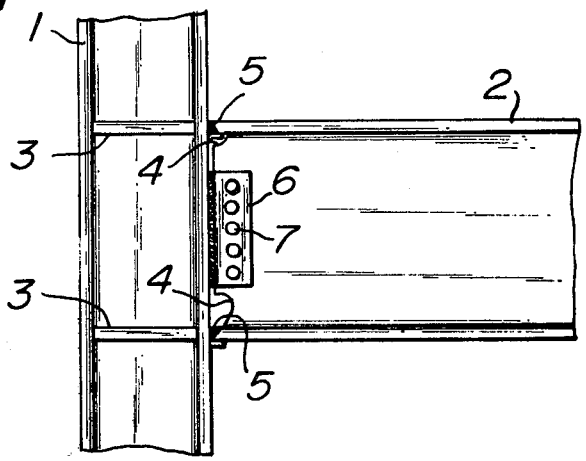
FIG_1b
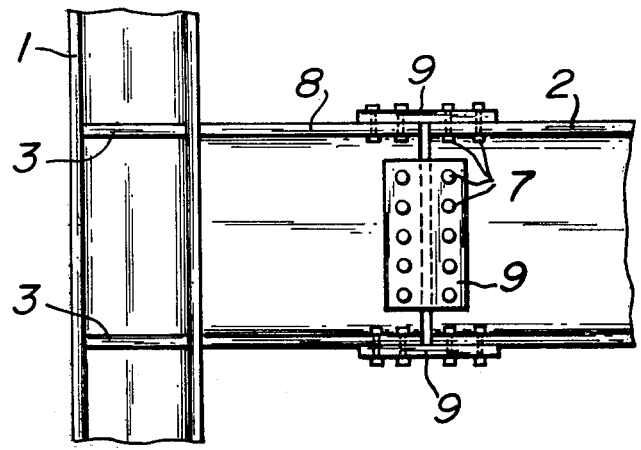
FIG_1c
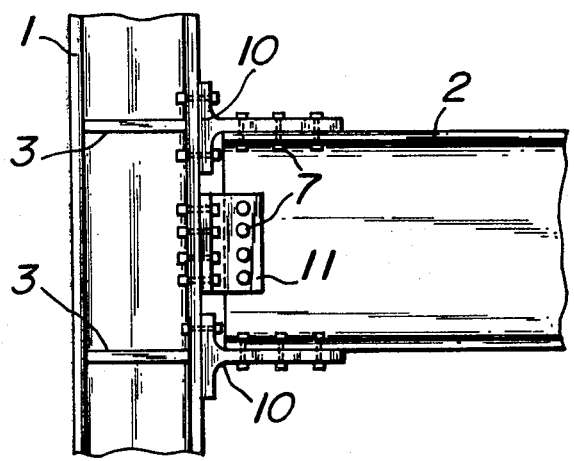

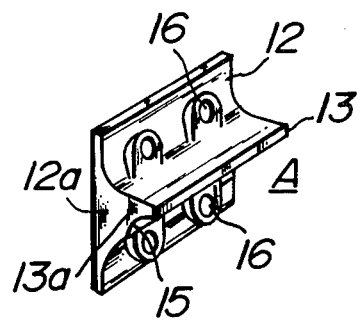
FIG_2a
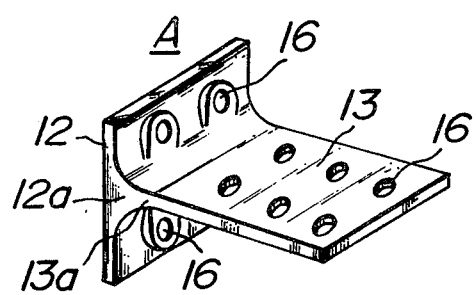
FIG_2b
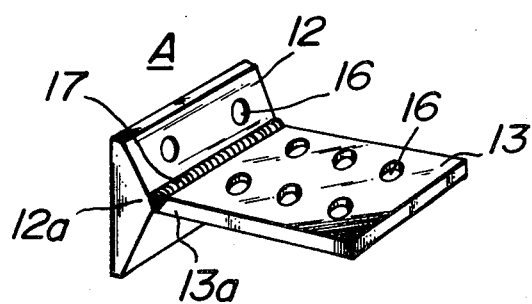
FIG_2c

FIG_3a
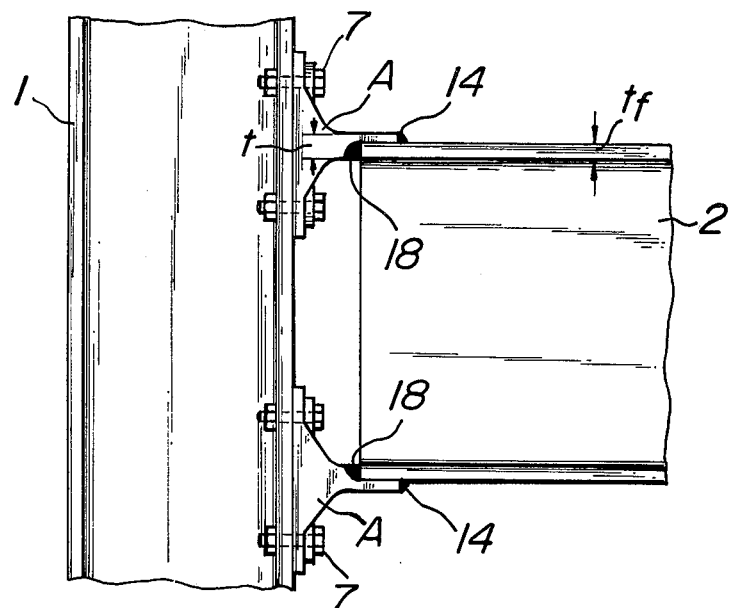
FIG_3b
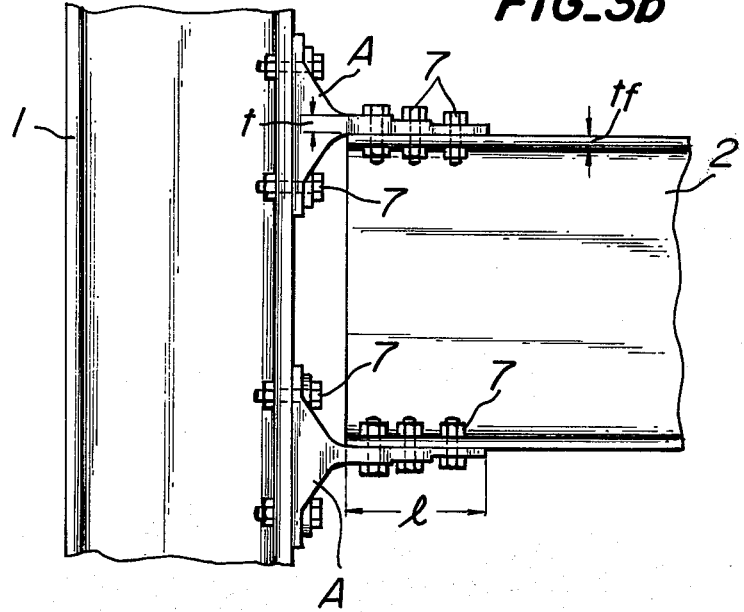

FIG_4
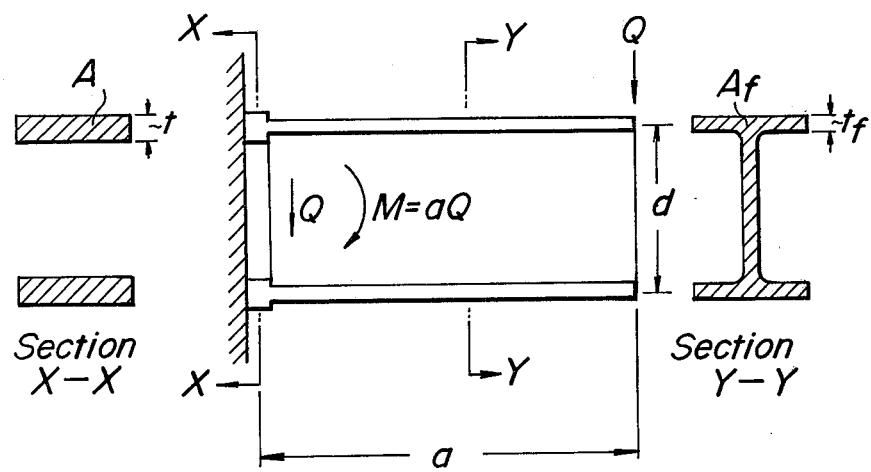
FIG_5
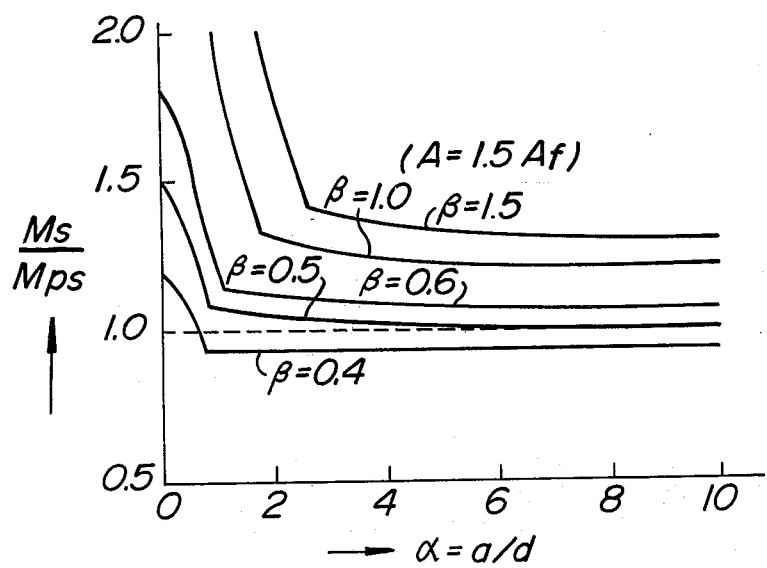

FIG_6
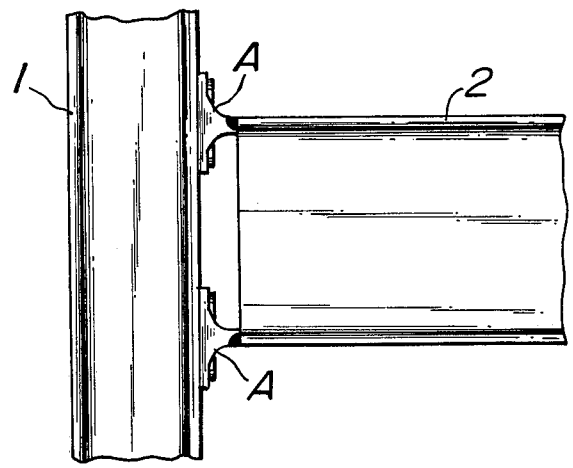
FIG_7a
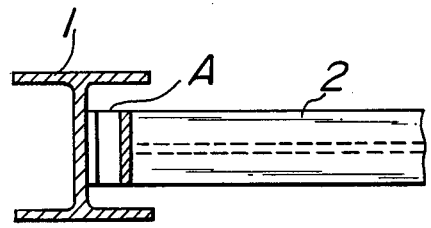
FIG_7b
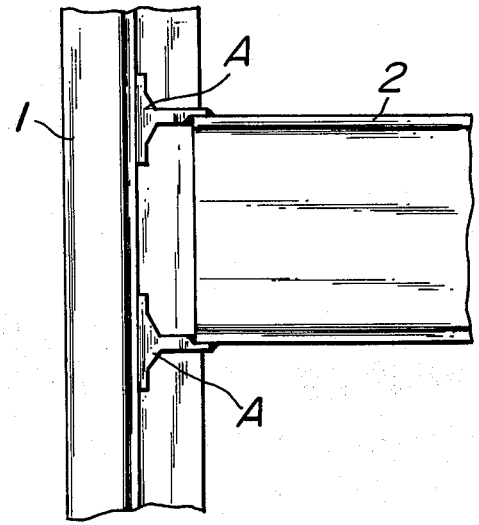

FITTINGS FOR CONNECTING COLUMNS AND BEAMS OF STEEL FRAME CONSTRUCTION

BACKGROUND OF THE INVENTION

1. Field of the Invention

The invention relates to fittings for connecting columns and beams of a steel frame construction and a method of connecting columns and beams and more particularly suitable for connecting beams having an I-shaped section to columns having an H-shaped or cross-shaped section.

2. Description of the Prior Art

In a prior art method of steel frame assembly for construction, all the welding operations are carried out in a field welding. In the method, however, beams must be provided at their end with bevelings and formed with notches for welding which may increase working cost of the beams. Moreover, maintenance of good quality control is difficult in the field quality control.

In another method column is provided with brackets previously welded thereto in a factory. In a building site, the bracket is connected to one end of a beam with connecting plates by means of high strength bolts. This method can overcome the problem with respect to the field welding, but a great many connections between columns and beams is required which makes the assembly of the construction complicated.

In yet another method, a column and a beam are connected by means of T-shaped members and connecting members bolted thereto respectively. This method has a disadvantage in that there may be great many working processes required for building the construction but each the connection has only a lower joint efficiency.

The first and second prior methods are inconvenient in transportation of the frame members such as columns because they are previously provided with the projections welded thereto in a factory.

In all the three prior methods, various kinds of members are required to fix the web of the beam to the column and horizontal stiffeners are required. These connections of the prior art intend to transmit a bending moment acting upon the beam through flanges thereof to the column and a shearing force acting upon the beam through the web thereof to the column, so that a great number of connecting members are required as above described which make the working and assembly complicated.

SUMMARY OF THE INVENTION

In order to overcome the above disadvantages in the prior art, the fittings according to this invention comprise a base plate having a flat surface for connecting with said column and on opposite surface with a horizontal protrusion formed centrally thereupon, and a horizontal plate extending from said horizontal protrusion to form with said base plate a T-shaped portion in section, a thickness of said horizontal plate at its bottom being more than that of a flange of the beam to be connected thereto, said base plate being formed with holes for bolts connecting said fitting to the column.

In another aspect the invention provides a method of connecting columns and beams of a steel frame construction, comprising steps of providing fittings each comprising a base plate having a flat surface for connecting with said column and formed centrally on an opposite surface with a horizontal protrusion, and a horizontal plate extending from said horizontal protrusion to form with said base plate a T-shaped portion in section, a thickness of said horizontal protrusion at its bottom being more than that of a flange of the beam to be connected thereto, said base plate being formed with holes for bolts connecting said fitting to the column; connecting said horizontal plates of said fittings to the ends of the flanges of the beam such that the horizontal plates outwardly overlap the flanges of the beam, respectively; and bolting the base plates of the fittings thus connected to the beam to the column.

An object of the invention is to provide improved fittings for connecting columns and beams of a steel frame construction capable of facilitating working of steel frame members in a factory, transportation of the members to a field and execution of works in the field to save the labor and to increase its efficiency and having a higher joint efficiency than that of the prior art.

Another object of the invention is to provide an improved method of connecting columns and beams of a steel frame construction capable of saving labor and increasing the joint efficiency to make lower the cost of the steel frame construction and higher the accuracy of the construction.

BRIEF DESCRIPTION OF THE DRAWINGS

FIG. 1a is a diagrammatical front elevation of a connection of a column and a beam of a steel frame construction in the prior art;

FIG. 1b is a diagrammatical front elevation of an another connection of a column and a beam of a steel frame construction in the prior art;

FIG. 1c is a diagrammatical front elevation of further connection of a steel frame construction in the prior art;

FIG. 2a is a perspective view of a preferred embodiment of the fitting according to the invention;

FIG. 2b is a perspective view of an another embodiment of the fitting according to the invention;

FIG. 2c is a perspective view of a further embodiment of the fitting according to the invention of which horizontal plate is welded to the base plate;

FIG. 3a is a front elevation of a connection of a column and a beam using the fittings welded to flanges of the beam according to the invention;

FIG. 3b is a front elevation of a connection of a column and a beam using the fittings bolted to flanges of the beam according to the invention;

FIG. 4 is a diagrammatical illustration of the connection according to the invention for explanation of the strength of the connection;

FIG. 5 is a diagram illustrating results of calculation of the strength of the connection according to the simplified illustration in FIG. 4;

FIG. 6 shows a modified embodiment of the invention;

FIG. 7a shows a further modified embodiment of the invention; and

FIG. 7b is a side elevation of the connection shown in FIG. 7a.

DESCRIPTION OF THE PREFERRED EMBODIMENTS

Referring to FIGS. 1a to 1c, there are shown three kinds of typical connections hitherto used of column 1 having an H-shaped section and beams 2 having an I-shaped section of steel frame constructions with horizontal stiffeners 3.

FIG. 1a shows a field welding method of the connection of columns and beams of the steel frame construction wherein all the welding operations are carried out in a field welding, which has disadvantages in that the beam 2 must be provided at its end with bevelings and formed with notches 4 for welding which may increase working cost of the beam, and the weldings 5 are effected by a field welding which is rather difficult to keep its good quality control. A joint member 6 is previously welded to the column 1 in a factory and is bolted to a web of the beam 2 by means of high strength bolts 7.

FIG. 1b shows another method of the connection wherein a column 1 is provided with brackets 8 previously welded thereto in a factory. In a building site, the bracket is connected to one end of a beam 2 with connecting plates 9 by means of high strength bolts 7. This method also has a disadvantage of great many connections between columns 1 and beams 2, which make all the operation of the construction complicated, although it overcomes the disadvantage resulting from the field welding as in FIG. 1a.

FIG. 1c shows further method of the connection wherein a column 1 and a beam 2 are connected by means of T-shaped members 10 and connecting members 11 bolted thereto respectively. This method has disadvantages in that there may be great many working processes required for building the construction but the connection has only a low joint efficiency.

As can be seen from the above description, the first and second prior methods are inconvenient in transportation of the frame members such as columns because they are previously provided with the projections welded thereto in a factory.

In all the three methods hitherto used, various kinds of members are required to fix the web of the beam to the column and horizontal stiffeners 3 are also required.

These connections hitherto used intend to transmit a bending moment acting upon the beam through flanges thereof to the column and a shearing force acting upon the beam through the web thereof to the column, so that a great number of connecting members are required as above described which make the working and assembly complicated.

In order to solve the problems above described, according to the invention particular fittings as shown in FIG. 2 are used as shown in FIG. 3 to connect the flanges of the beam to the flange of the column, so that the bending moment and the shearing force are transmitted through the connections of the flanges to the column. Accordingly, any connections of the webs such as in the prior art can be dispensed with.

Referring to FIGS. 2 and 3, the fitting A according to the invention comprises a base plate 12 having a flat surface adapted to be in contact with the flange of the column 1 and is formed on opposite surface with a thicker portion or horizontal protrusion 12a which extends further as a horizontal plate 13 in parallel with the flange of the beam to form with the base plate a T-shaped portion. The base plate is formed in position with holes for bolts (FIG. 2). The thickness $t$ at the bottom 23a of the horizontal plate 13 (FIG. 3) is more than that of the flange of the beam in consideration of a resultant force of an axial force and the shearing force acting upon the flange of the beam 2. The length $l$ of the horizontal plate 13 which overlaps the flange of the beam 2 is determined to be able to arrange required bolts within the length of the horizontal plate as shown in FIG. 3b or to effect a fillet welding 14 of the end of the horizontal plate with the flange of the beam as shown in FIG. 3a. The horizontal plate 13 may be formed along its edge with a beveling 15 for butt welding (FIG. 2a) and may be formed in position with holes for bolts (FIG. 2b).

The fittings A shown in FIGS. 2a and 2b are integrally made by casting or forging. The fitting A shown in FIG. 2a is connected to the flange of the beam by means of welding. The fitting A shown in FIG. 2b is connected to the flange of the beam by means of bolts.

A fitting A as shown in FIG. 2c adapted to be bolted to the flange of the beam consists of a base plate 12 formed by rolling or extruding and a horizontal plate 13 of a steel plate welded thereto to form a unitary fitting.

FIGS. 3a and 3b illustrate the connections of the columns 1 and the beams 2 of steel frame constructions using the fittings A according to the invention.

As shown in FIG. 3a, the fittings A are previously welded at 14 and 18 to the beam 2 in a factory and then in building site are bolted to the column by means of high strength bolts 7 subjected to tensile stresses. In FIG. 3b, the fittings A are bolted to the flanges of the beam 2 by means of high strength bolts 7. A combination of the connections as shown in FIGS. 3a and 3b may be expected, such for example, as the fitting as shown in FIG. 2a is welded to the upper flange of the beam as shown in the upper portion of FIG. 3a and the fitting as shown in FIG. 2b or 2c is bolted to the lower flange of the beam as shown in the lower portion of FIG. 3b.

Assuming that the thickness of the flange of the beam 2 is $t_f$ and the thickness of the bottom of the horizontal plate of the fitting is $t$, it has been found theoretically and experimentally that the yield strength of the connection with the fitting will be as much as 70–80% of the strength of the beam, if $t=t_f$, and the yield strength of the connection will be substantially the same as that of the beam, if $t=1.5t_f$.

The strength of the connection will be explained in detail hereinafter referring to FIG. 4 illustrating a diagrammatically simplified connection joining only the flanges according to the invention.

If a normal stress $\sigma$ and a shearing stress $\tau$ are uniformly distributed in the connecting flange having a sectional area A and the each member yields according to the Von Mises yielding condition, a moment $M_s$ of resistance at the connection will be given as (4) by the following equations 1–3, $$\sigma_y = \sqrt{\sigma^2 + \tau^2} \tag{1}$$

$$\sigma = \frac{M}{dA} \tag{2}$$

$$\sigma = \frac{Q}{2A} = \frac{M}{2aA} \tag{3}$$

$$M_s = \frac{aA\sigma_y}{\sqrt{(\frac{a}{d})^2 + \frac{3}{4}}} \tag{4}$$

where the $\sigma_y$ is the yield stress and $a/d=\alpha$ is the ratio of the length to the height of the beam.

The $M_s$ of the equation (4) is divided by the yield strength $M_{ps}$ of the beam (the plastic limit at the overall web section under a combination stress condition of the bending moment and the shearing stress), and $M_s/M_{ps}$ is given by either larger value of the following equations (5) and (6), $$\frac{M_s}{M_{ps}} = \frac{\frac{3}{2}\beta \cdot A/A_f}{\sqrt{\alpha^2+\frac{3}{4}} \cdot (\sqrt{\alpha^2+3\beta+\frac{3}{4}}-\alpha)} \quad (5)$$

$$\frac{M_s}{M_{ps}} = \frac{\sqrt{3}\beta \cdot A/A_f}{\sqrt{\alpha^2+\frac{3}{4}}} \quad (6)$$

where $\beta$ is $A_f/A_w$ and $A_f$ is the sectional area of the flange of the beam and $A_w$ is the sectional area of the web of the beam.

Substituting $A=1.5A_f$ and $\beta=0.4, 0.5, 0.6, 1.0$ and $1.5$ in the equations (5) and (6) gives the results as shown in FIG. 5. As the $\beta$ is 0.5 to 1.5 in usual beams, it is clearly evident from the curves in FIG. 5 that if A equals to $1.5A_f$ the connection has the sufficient yield strength corresponding to that of the beam.

This fact has been experimentally ascertained. Moreover, it has been found from results of further experiments that the connection according to the invention does not decrease its yield strength and exhibits a sufficient toughness (deformability) even if a plastic strain increases more than 15%.

In case of the connection which transmits 70–80% of the overall strength of the beam, the sectional area A of the horizontal plate of the fitting can be equal to that $A_f$ of the flange of the beam as shown in FIG. 6.

Moreover, the fitting according to the invention can also be applied to the web of a column having an H-shaped section as shown in FIG. 7. In this case, the height of the beams gathered together at the column can be selected at any value and all that is required for the column to be worked is only drilling, so that a period for manufacturing the steel frame construction is shortened to reduce the cost of buildings and the steel frame construction can be built with a very high accuracy.

The effects of the fittings according to the invention distinguishable over those of the prior art are as follows:

1. A connection of the web of the beam to the column is not needed, so that the fittings can be simplified in configuration to reduce its weight and to facilitate and simplify the working and assemblying the fittings at the steel frame, so that an amount of steel and cost for manufacturing the steel material are saved and building operation in site is simplified. Accordingly, the invention serves to save the labor and improve the efficiency as a whole in comparison with the prior art.
2. Because the fittings according to the invention connected to the flanges of the beams and columns assuredly transmit the bending moments and shearing forces acting upon the beams to the column, the connections at the fittings have the yield strength corresponding to the overall strength of the beams and exhibit sufficient toughness by a proper selection of the thickness $t$ at the bottom of the horizontal plates of the fittings.
3. The fittings according to the invention bolted to the flanges of the columns by means of high strength bolts provide rigid zones which increase the rigidity of the connections and serve to distribute compressive stresses from the flanges to the columns as uniformly as possible so that in many cases horizontal stiffeners of the columns are not required.
4. Furthermore, there are following advantages brought about by the fittings according to the invention.
   a. The columns without any protrusions can be transported with ease.
   b. As the fittings may be formed with bevelings, the beams need not be further worked as they are cut by saw or gas cutting. Accordingly, the working of the columns and beams becomes simplified and easier.
   c. The fittings can be formed freely and smoothly in configuration to eliminate any stress concentration and made in light weight which serves to improve the joint efficiency.
   d. Fittings made of isotropic material can be manufactured in mass-production in a factory.
5. In the fittings adapted to be welded to the flange of the beam as shown in FIG. 3a, the working of the beams and columns is extremely simplified because the end of the beam need not be further worked after it has been cut off a longer beam material and the columns need only be drilled in position. Moreover the column need not be provided with horizontal stiffeners welded thereto, so that strains caused by welding can be eliminated to provide steel frame constructions with a high accuracy.

It is understood by those skilled in the art that the foregoing description is a preferred embodiment of the disclosed fittings and that various changes and modifications may be made in the invention without departing from the spirit and scope thereof.

What is claimed is:

1. A unitary fitting for connecting columns and beams of steel construction, each fitting comprising a base plate having a flat surface for substantially uniform face-to-face contact with said column and for connecting a beam with said column, said fitting including an outwardly extending protrusion formed substantially centrally on its opposite surface, said fitting further including a flat plate in connecting facial contact with the flange of said beam, said beam contacting plate forming a generally T-shaped section with said base plate and being thicker than said beam flange.

2. Fittings as set forth in claim 1, wherein said flat plate is formed along its edge with a beveling for butt welding to the flange of the beam.

3. Fittings as set forth in claim 1, wherein said flat plate extends a distance sufficient to arrange bolts therethrough for connecting with the flange of the beam and is formed with holes for the bolts.

4. The fitting of claim 1 wherein the thickness of said plate is not less than 1.5 times the thickness of the beam flange.

5. A unitary fitting for connecting columns and beams of steel construction, each fitting comprising a base plate having a flat surface for substantially uniform face-to-face contact with said column and for connecting a beam with said column, said fitting including an outwardly extending protrusion the surface of said protrusion tapering outwardly at a distance equal to more than twice the thickness of the beam flange engaging plate thereby distributing stress over an enlarged area of the base plate, said fitting further including a flat plate in connecting facial contact with the flange of said beam, said beam contacting plate forming a generally T-shaped section with said base plate and being thicker than said beam flange.

6. A joint for steel framed construction comprising a column, a beam and a unitary fitting for connecting said column and said beam comprising a base plate having a flat surface for substantially uniform face-to-face contact with said column and for connecting a beam with said column, said fitting including an outwardly extending protrusion formed substantially centrally on its opposite surface, said fitting further including a flat plate in substantial facial contact with the flange of said beam, said beam contacting plate forming a generally T-shaped section with said base plate and being thicker than said beam flange.

\* \* \* \* \*